(12) United States Patent
Sato et al.

(10) Patent No.: US 8,933,370 B2
(45) Date of Patent: Jan. 13, 2015

(54) ARC WELDING CONTROL METHOD AND ARC WELDING CONTROL SYSTEM

(75) Inventors: Kimiya Sato, Hyogo (JP); Atsuhiro Kawamoto, Hyogo (JP); Akira Nakagawa, Osaka (JP); Junji Fujiwara, Osaka (JP)

(73) Assignee: Panasonic Corporation, Osaka (JP)

( * ) Notice: Subject to any disclaimer, the term of this patent is extended or adjusted under 35 U.S.C. 154(b) by 576 days.

(21) Appl. No.: 13/130,068

(22) PCT Filed: Apr. 2, 2010

(86) PCT No.: PCT/JP2010/002435
§ 371 (c)(1),
(2), (4) Date: May 19, 2011

(87) PCT Pub. No.: WO2010/119634
PCT Pub. Date: Oct. 21, 2010

(65) Prior Publication Data
US 2011/0226749 A1 Sep. 22, 2011

(30) Foreign Application Priority Data
Apr. 17, 2009 (JP) ................................ 2009-100533

(51) Int. Cl.
*B23K 9/10* (2006.01)
*B23K 9/067* (2006.01)
*B23K 9/073* (2006.01)
*B23K 9/095* (2006.01)

(52) U.S. Cl.
CPC ............. *B23K 9/0671* (2013.01); *B23K 9/0735* (2013.01); *B23K 9/0734* (2013.01); *B23K 9/0953* (2013.01); *B23K 9/0956* (2013.01)
USPC ................................ 219/130.31; 219/137 PS

(58) Field of Classification Search
USPC ................ 219/130.31, 130.5, 130.51, 137 PS
See application file for complete search history.

(56) References Cited

U.S. PATENT DOCUMENTS 5,416,299 A * 5/1995 Tabata et al. .............. 219/130.51
6,248,976 B1 6/2001 Blankenship
(Continued)

FOREIGN PATENT DOCUMENTS

| CN | 1380842 A | 11/2002 |
| CN | 1672852 A | 9/2005 |

(Continued)

OTHER PUBLICATIONS

Chinese Search Report for Application No. 201080004021.0 dated Aug. 15, 2013.
(Continued)

*Primary Examiner* — Brian Jennison
(74) *Attorney, Agent, or Firm* — RatnerPrestia

(57) ABSTRACT

A welding control method alternately repeats a short circuit period, during which a welding wire and an object to be welded short-circuit, and an arc period, during which an arc is generated and discharged, to weld the object to be welded. The method compares average output voltage, which is an average of welding voltage calculated during welding, to set voltage preliminarily set, and controls a welding output current produced when an arc is generated based on the comparison result therefrom, to regulate the meltage of the wire for adjusting the arc length, which brings the short circuit cycle closer to a constant one when a disturbance (e.g. extended or shortened arc length) occurs.

5 Claims, 3 Drawing Sheets

(56) References Cited

U.S. PATENT DOCUMENTS

| | | | |
|---|---|---|---|
| 7,598,475 | B2 | 10/2009 | Kawamoto et al. |
| 2006/0283847 | A1* | 12/2006 | Kawamoto et al. ..... 219/137 PS |

FOREIGN PATENT DOCUMENTS

| CN | 1819887 | A | 8/2006 |
|---|---|---|---|
| JP | 59-202171 | | 11/1984 |
| JP | 09-182961 | A | 7/1997 |
| JP | 09-277044 | A | 10/1997 |
| JP | 2002-361417 | A | 12/2002 |
| JP | 2002-361417 | A | 12/2002 |
| JP | 2003-230958 | A | 8/2003 |
| JP | 2003-230958 | A | 8/2003 |
| JP | 2003-290924 | A | 10/2003 |
| JP | 2003-290924 | A | 10/2003 |
| JP | 2004-082152 | A | 3/2004 |
| JP | 2004-082152 | A | 3/2004 |
| JP | 2005-271042 | A | 9/2005 |
| JP | 2005-217042 | | 10/2005 |
| JP | 2005-271042 | A | 10/2005 |
| JP | 2006-021227 | A | 7/2010 |
| WO | PCT/JP2010/002435 | | 7/2010 |

OTHER PUBLICATIONS

Supplementary European Search Report for EP10764221 dated Jul. 25, 2014.

\* cited by examiner

ARC WELDING CONTROL METHOD AND ARC WELDING CONTROL SYSTEM

This application is A U.S. national phase application of PCT INTERNATIONAL APPLICATION PCT/JP2010/002435.

TECHNICAL FIELD

The present invention relates to an arc welding control method and an arc welding control apparatus in which an arc is discharged between a welding wire as a consumable electrode and welding base material as an object to be welded to control welding output.

BACKGROUND ART

In recent years, from the aspect of protecting the earth environment, the automobile and motorbike industries have been making material plates thinner year by year for weight reduction to improve fuel efficiency. Accordingly, increasing productivity and welding quality is requested in arc welding for thin plates by robots. Then, demands for increasing welding speed, decreasing sputtering, and preventing defects (e.g. burn-through and undercut) need to be satisfied. Among them, increasing welding speed increases the number of products manufactured per unit time. Meanwhile, preventing burn-through for workpieces having a gap therebetween raises yields of object to be welded to reduce reworking worker-hours. Under the circumstances, the market has been requesting solution to the problems more strongly year by year.

To satisfy these requests, various methods for increasing welding speed and for gap welding have been devised conventionally. For example, the following method is available. That is, a welding output current immediately after arc regeneration is made higher than that immediately before short circuit opening to cause a droplet to be formed soon after the arc regeneration, which shortens the cycle of short circuit generation, lowers welding voltage, and shortens the arc length (refer to patent literature 1 for example). This method suppresses burn-through even in gap welding by increasing welding speed to lower heat input.

FIG. 4 shows waveforms of welding output voltage and a welding output current in a case where welded by the above conventional output control method. In FIG. 4, the horizontal axis indicates elapsed time, and the vertical axis indicates welding output voltage and a welding output current. In FIG. 4, short circuit period 101 is in a state where a wire and base material short-circuit. Arc period 102 is in a state where an arc is generated between the wire and base material. At arc regeneration time point 103, the short circuit opens to regenerate an arc. Immediately before the short circuit opening, immediately-before-short-circuit-opening current 104a is flowing. In arc period 102, arc initial current 105a is flowing during initial control period 106.

Next, the current waveform shown in FIG. 4 is described in relation to a control way by elapsed time. After an arc is regenerated, a low welding output current is steeply increased to be arc initial current 105a. Control is exercised so that a constant current is output during initial control period 106, and then the welding current value gradually decreases by arc control (voltage control). As shown in the drawing, arc initial current 105a is controlled for a value of immediately-before-short-circuit-opening current 104a with superimposed current value 107 added thereto, which enables a droplet to be formed early at the tip of the wire. In other words, arc initial current 105a is controlled so as to be always higher than immediately-before-short-circuit-opening current 104a.

This enables a droplet to be formed soon after the arc regeneration, which shortens the cycle of short circuit generation, lowers welding voltage, and shortens the arc length. Accordingly, the welding speed is increased to lower heat input, thereby suppressing burn-through even in gap welding.

In the above-described conventional output control method, however, longer arc length than appropriate one due to such as a disturbance causes arc period 102 to be extended as shown in FIG. 5. Consequently, the cycle of short circuit generation becomes longer than that in the welding state shown in FIG. 4, thereby raising the average value of welding output voltage. In this case, the meltage of the wire increases to extend the next short circuit time, which causes current value 104b immediately before the short circuit opening to be longer than current value 104a immediately before the previous short circuit opening. Further, arc initial current 105b becomes longer than previous arc initial current 105a.

The higher average value of welding output voltage requires lower output voltage. However, arc initial current 105b is controlled so as to be higher than previous arc initial current 105a, and thus control is exercised so as to increase welding output voltage. That is to say, the short circuit cycle cannot be shortened by suppressing the meltage to shorten the arc length.

Accordingly, when a disturbance (e.g. extended projection length and arc length) occurs, the meltage of the wire increases and the arc period is extended, which causes the bead width to be uneven. Further, heat input cannot be reduced, which causes such as burn-through in gap welding.

CITATION LIST

Patent Literature

[Patent literature 1] Japanese Patent Unexamined Publication No. 2006-021227

SUMMARY OF THE INVENTION

The present invention provides an arc welding control method and arc welding apparatus in which the meltage of a wire is suppressed to shorten the arc length for reducing the short circuit cycle when a disturbance (e.g. extended projection length and arc length) occurs.

The arc welding control method of the present invention is one in which an object to be welded is welded by alternately repeating a short circuit period (during which a welding wire and an object to be welded short-circuit) and an arc period (during which an arc is discharged). By the method, average output voltage (average welding voltage calculated during welding) is compared to set voltage (voltage preliminarily set), and a welding output current produced when an arc is generated is controlled based on the comparison result.

The arc welding control apparatus of the present invention is one that welds an object to be welded by alternately repeating a short circuit period (during which a welding wire and an object to be welded short-circuit) and an arc period (during which an arc discharged). The apparatus includes:
 a welding current detecting unit detecting a welding output current;
 a welding voltage detecting unit detecting welding output voltage;
 a switching element controlling welding output;
 a short circuit arc determining unit determining whether the welding state is in a short circuit period or arc period;

a setting unit for setting at least one of a current and voltage during a short circuit period, at least one of a current and voltage during an arc period, set voltage, and a given current value;

an arc initial control unit controlling a welding output current produced when an arc is initially generated by receiving each output from the welding current detecting unit, the welding voltage detecting unit, and the setting unit as input;

a drive unit controlling the switching element based on output from the short circuit arc determining unit;

a timer unit timing a given time period after an arc is generated by receiving output from the short circuit arc determining unit as input, and outputting the time to the drive unit;

an average voltage calculating unit calculating average output voltage (i.e. average welding voltage) based on the detection result from the welding voltage detecting unit; and a voltage comparing unit comparing set voltage set by the setting unit to average output voltage calculated by the average voltage calculating unit. The arc initial control unit controls a welding output current produced when an arc is generated based on the comparison result from the voltage comparing unit.

With such a configuration, a welding output current produced when an arc is regenerated is determined based on the difference between set voltage and average output voltage to regulate the meltage of a wire when a disturbance (e.g. extended or shortened arc length) occurs for adjusting the arc length, which brings the short circuit cycle closer to a constant one to enable lower heat input. This enables uniformizing the bead width and suppressing burn-through in gap welding, which expands the application range when a disturbance occurs and when gap welding is performed.

DETAILED DESCRIPTION OF PREFERRED EMBODIMENT

Exemplary Embodiment

An arc welding apparatus of this embodiment welds an object to be welded by alternately repeating a short circuit period (during which the welding wire and the object to be welded short-circuit) and an arc period (during which an arc is discharged). The apparatus predicts generation of an arc during a short circuit period and decreases a welding output current immediately before the generation of the arc to open the short circuit.

Figure 1:
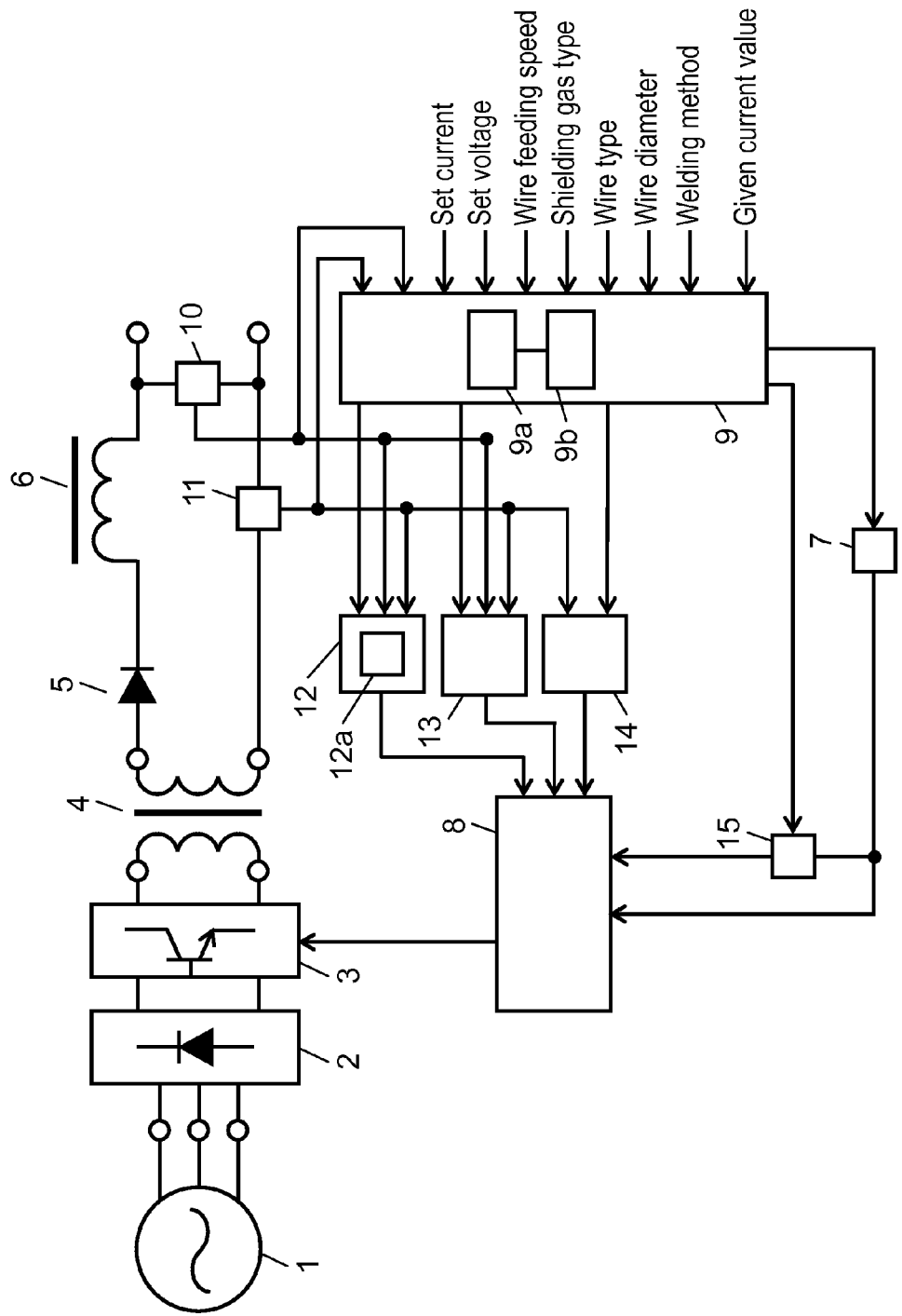
FIG. 1 shows a schematic structure of an arc welding apparatus according to an exemplary embodiment of the present invention.
Figure 2:
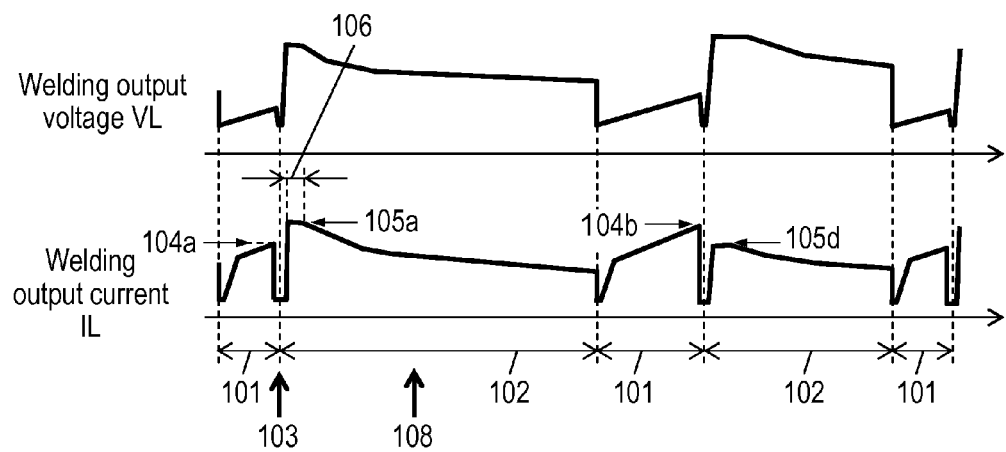
FIG. 2 shows a voltage waveform and a current waveform of welding output in a case where the arc length becomes longer than that in regular welding in the arc welding apparatus of the embodiment.
Figure 3:
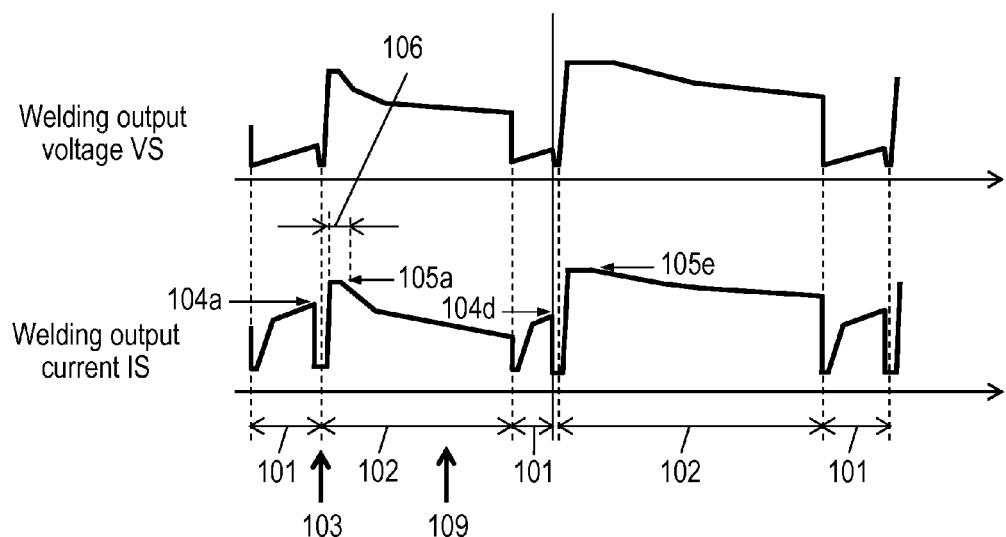
FIG. 3 shows a voltage waveform and a current waveform of welding output in a case where the arc length becomes shorter than that in regular welding in the arc welding apparatus of the embodiment.
Figure 4:
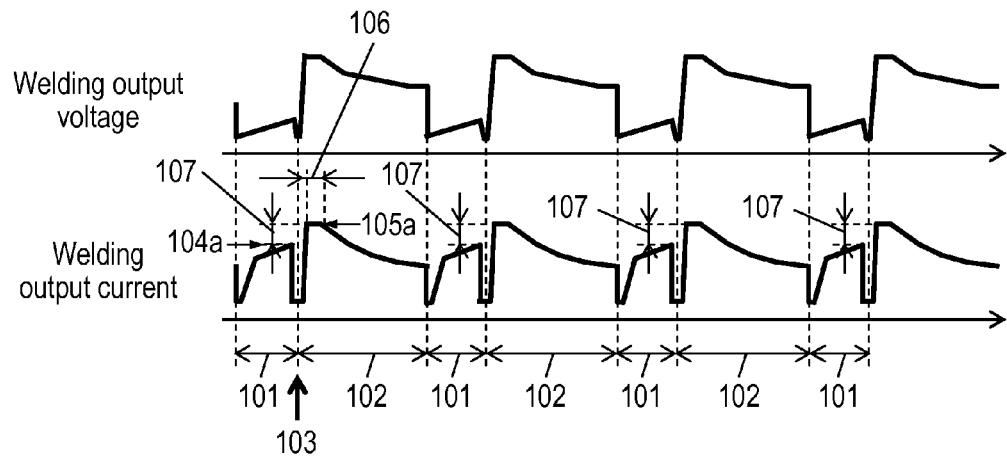
FIG. 4 shows a voltage waveform and a current waveform of welding output in regular welding in a conventional arc welding apparatus.

A description is made of the arc welding apparatus and its control method of this embodiment using FIGS. 1 through 3. FIG. 1 shows a schematic structure of the arc welding apparatus. FIG. 2 shows a voltage waveform and a current waveform of welding output in a case where the arc length becomes longer than appropriate length in regular welding and the arc period becomes longer than that in regular welding due to such as a disturbance in the embodiment. FIG. 3 shows a voltage waveform and a current waveform of welding output in a case where the arc length becomes shorter than appropriate length in regular welding and the arc period becomes shorter than that in regular welding due to such as a disturbance in the embodiment.

In FIG. 1, AC power input from commercial power supply 1 is rectified by primary rectifier 2 and converted to an alternating current by switching element 3 for controlling welding output. Output voltage from switching element 3 is isolated from commercial power supply 1; stepped-down by transformer 4; rectified by secondary rectifier 5 connected to the secondary-side output of transformer 4; and provides welding output through reactor 6. This welding output is applied between a welding wire and an object to be welded (both are not shown).

The arc welding apparatus of this embodiment further includes welding current detecting unit 11 inserted in series with a DC output terminal, detecting a welding output current; welding voltage detecting unit 10 connected between the ends of the DC output terminals, detecting welding output voltage; and a short circuit arc determining unit determining whether the welding state is in a short circuit period or arc period. The arc welding apparatus of this embodiment further includes setting unit 9 setting a set current for obtaining a welding current; set voltage for obtaining welding voltage; feeding speed of a welding wire; type of a shielding gas for arc welding; type of a wire; diameter of a wire; way of welding (e.g. whether pulse control and/or crater welding are performed); and a given current value required in the embodiment. Setting unit 9 receives output from welding voltage detecting unit 10 and welding current detecting unit 11 as input. Setting unit 9 sets various types of parameters required for welding by receiving the above-described various types of set conditions as input. In this way, setting unit 9 sets at least one of a current and voltage during a short circuit period, at least one of a current and voltage during an arc period, set voltage, and a given current value.

The arc welding apparatus of this embodiment further includes arc initial control unit 12 setting and outputting a welding output current produced when an arc is initially regenerated by receiving output from welding current detecting unit 11, welding voltage detecting unit 10, and setting unit 9 as input. The arc welding apparatus of this embodiment further includes drive unit 8 controlling switching element 3 based on output from short circuit arc determining unit 7; and timer unit 15 that times a given time period from when an arc is generated by receiving output from short circuit arc determining unit 7 as input, sets arc initial control time, and outputs the arc initial control time to drive unit 8.

Further, in the arc welding apparatus of this embodiment, arc initial control unit 12 that controls an output current during a given time period after an arc is regenerated receives output from welding voltage detecting unit 10, welding current detecting unit 11, and setting unit 9, and outputs them to drive unit 8. Arc control unit 13 that controls output voltage during an arc period after a given time period during which arc initial control unit 12 exercises control receives output from welding voltage detecting unit 10, welding current detecting unit 11, and setting unit 9 setting voltage during an arc period to a constant value, a falling voltage straight line, or falling voltage curved line, and outputs control data to drive unit 8. Here, the description is made that voltage control is exercised during an arc period; however, setting unit 9 may set a current by current control instead of voltage control. Short circuit control unit 14 controlling an output current during a short circuit period receives output from welding current detecting unit 11 and setting unit 9 setting a current as a current waveform of a combination of a straight line or a curved line, and outputs them to drive unit 8. Here, the description is made that current control is exercised during a short circuit period; however, setting unit 9 may set voltage by voltage control instead of current control. Timer unit 15 receives output from short circuit arc determining unit 7 and setting unit 9; times a given time period from when an arc is generated; sets an arc initial control time; and outputs the arc initial control time to drive unit 8.

Setting unit 9 includes average voltage calculating unit 9a calculating average output voltage based on detection results from welding voltage detecting unit 10; and voltage comparing unit 9b comparing set voltage set by setting unit 9 to average output voltage calculated by average voltage calculating unit 9a. Arc initial control unit 12 includes welding output current computing unit 12a computing and determining a welding output current produced when an arc is generated based on a comparison result from voltage comparing unit 9b, and controls drive unit 8 for a welding output current determined by welding output current computing unit 12a during a given time period from when an arc is regenerated.

More specifically, if the comparison result from voltage comparing unit 9b shows that the average output voltage is higher than the set voltage, welding output current computing unit 12a of arc initial control unit 12 multiplies a given current value preliminarily set by a multiplication factor (smaller than 1) based on the difference between the average output voltage and set voltage, to calculate a welding output current produced when an arc is generated. Arc initial control unit 12 controls output so that a welding output current produced when an arc is generated becomes the welding output current (smaller than the given current value) calculated. Meanwhile, if the comparison result from voltage comparing unit 9b shows that the average output voltage is lower than the set voltage, welding output current computing unit 12a of arc initial control unit 12 multiplies a given current value preliminarily set by a multiplication factor (larger than 1) based on the difference between the average output voltage and set voltage, to calculate a welding output current produced when an arc is generated. Arc initial control unit 12 controls output so that a welding output current produced when an arc is generated becomes the welding output current (larger than the given current value) calculated during the arc initial control time set by timer unit 15.

Here, the average output voltage is an average value of output voltage during a given time period preliminarily determined, calculated for every given time period, and calculated by average voltage calculating unit 9a of setting unit 9 based on output from welding voltage detecting unit 10.

A description is made of operation of the arc welding apparatus configured as above. FIG. 2 shows a voltage waveform and a current waveform of welding output when the welding state shifts to a short circuit in consumable-electrode arc welding, where the horizontal axis indicates elapsed time; the vertical axis indicates welding output voltage VL and welding output current IL. FIG. 2 shows welding current waveform IL in a case where the arc length becomes longer than appropriate length in regular welding.

In FIG. 2, welding output current IL has short circuit period 101 (the wire and base material short-circuit), arc period 102 (an arc is generated between the wire and base material), arc regeneration time point 103 (the short circuit opens and an arc is regenerated), and timing 108 (time point at which the arc length extends from appropriate length. Welding output current IL becomes immediately-before-short-circuit-opening current values 104a and 104b before arc regeneration time point 103 and immediately before the short circuit opening after short circuit period 101, respectively. The waveform of welding output current VL changes according to that of welding output voltage IL as shown in the drawing.

In this embodiment, timer unit 15 first sets initial control time 106 at arc regeneration time point 103 shown in FIG. 2, with the time point being an origin. Arc initial control unit 12 controls welding output current IL during this arc initial control time 106 for arc initial current value 105a. Initial control time 106 is preliminarily determined experimentally for example.

During arc period 102 after arc initial control time 106, arc control unit 13 controls output voltage VL. If the arc length becomes longer than appropriate length at timing 108 due to a disturbance such as hand shakes and displacement of an object to be welded, arc period 102 becomes longer than a case of appropriate length as shown in FIG. 2, which delays short circuit generation to raise the average output voltage. Delayed generation of a short circuit encourages the wire to melt, which requires more time for a droplet at the tip of the melted wire to transfer to the base material, resulting in the next short circuit time being longer. Hence, immediately-before-short-circuit-opening current value 104b is higher than previous immediately-before-short-circuit-opening current value 104a.

Here, a description is made of the control way according to this embodiment in a case where short circuit generation is delayed and average output voltage becomes higher than the set voltage.

Based on output from setting unit 9, welding output current computing unit 12a of arc initial control unit 12 multiplies given current value I preliminarily set in setting unit 9 by a given multiplication factor (coefficient) smaller than 1 according to the difference between the set voltage and average output voltage, to determine arc initial current 105d smaller than the given current value. Herewith, arc initial control unit 12 exercises current control so that arc initial current 105d smaller than given current value I flows during initial control time 106.

Here, given current value I is an arc initial current value for appropriate arc length, which enables necessary and sufficient arc length immediately after arc regeneration to be secured. The current value differs depending on a set current, set voltage, wire feeding speed, shielding gas type, wire type, wire diameter, welding method, and others, determined by various kinds of experiments and setting unit 9. Arc initial current 105d is controlled according to the difference between set voltage and average output voltage, and thus does not relate to immediately-before-short-circuit-opening current 104b, which is a current immediately before short circuit opening.

Figure 5:
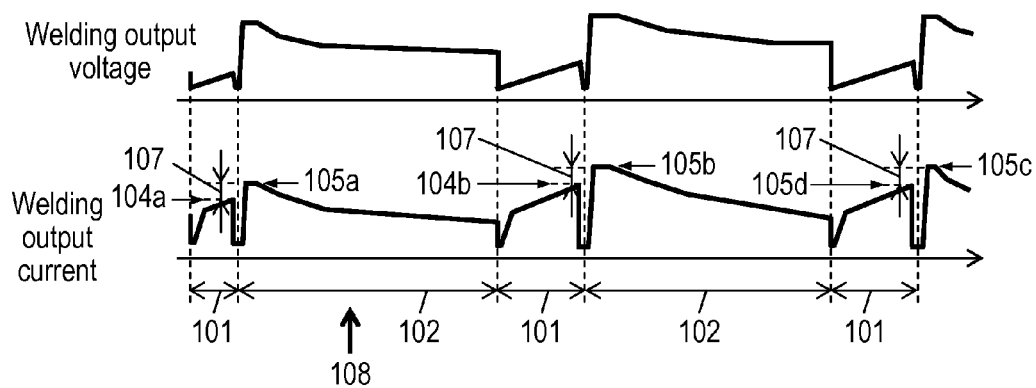
FIG. 5 shows a voltage waveform and a current waveform of welding output in a case where the arc length becomes longer than that in regular welding in the conventional arc welding apparatus.

By conventional control, arc initial current 105b is always raised higher than immediately-before-short-circuit-opening current 104b as shown in FIG. 5. In this embodiment, meanwhile, if short circuit generation is delayed and the average output voltage becomes higher than the set voltage, arc initial current 105b is decreased to arc initial current 105d lower than immediately-before-short-circuit-opening current 104b as shown in FIG. 2. Herewith, welding output can be lowered during a period after arc initial current 105*d* in arc period 102, which allows the average output voltage to early become the set voltage.

Accordingly, when a disturbance (e.g. extended projection length and arc length) occurs, the meltage of a wire is suppressed to shorten the arc length for reducing the short circuit cycle to enable lower heat input. This enables uniformizing the bead width and suppressing burn-through in gap welding, which expands the application range when a disturbance occurs and when gap welding is performed.

The above description is made of the control way in a case where the arc length becomes longer than appropriate length due to a disturbance to extend arc period 102. Next, a description is made of a control way in a case where the arc length becomes shorter than appropriate length to shorten the arc period using FIG. 3. FIG. 3 shows welding output voltage waveform VS and welding output current waveform IS in a case where the arc length becomes shorter than that in regular welding in the arc welding apparatus of the embodiment. FIG. 3 shows a case where the arc length becomes shorter than appropriate length at timing 109 to shorten arc period 102. Similarly to FIG. 2, the horizontal axis indicates elapsed time; the vertical axis indicates welding output voltage VS and welding output current IS. A component same as that in FIG. 2 is given the same reference mark to omit its description.

When the arc length is shortened at timing 109, arc period 102 is shortened as shown in FIG. 3, which advances short circuit generation to lower the average output voltage. When short circuit generation is advanced, a short circuit is generated with a melted part of the wire tip being small, and thus time required for a droplet at the wire tip to transfer to the base material is shortened, resulting in the next short-circuit time being shorter. Accordingly, as shown in FIG. 3, immediately-before-short-circuit-opening current value 104*d* (i.e. a current value immediately before short circuit opening) becomes lower than immediately-before-short-circuit-opening current value 104*a*.

Here, a description is made of a control way according to this embodiment in a case where short circuit generation is advanced; and the average output voltage is decreased to be lower than the set voltage. Based on output from setting unit 9, welding output current computing unit 12*a* of arc initial control unit 12 multiplies given current value I preliminarily set in setting unit 9 by a given multiplication factor (coefficient) larger than 1 according to the difference between the set voltage and average output voltage, to determine arc initial current 105*e* larger than the given current value. Herewith, arc initial control unit 12 exercises current control so that arc initial current 105*e* larger than given current value I flows during initial control time 106.

Here, given current value I described above is the same as given current value I described in FIG. 2, that is, in a case where the arc length becomes longer than appropriate length; short circuit generation is delayed; the average output voltage is increased; and the average output voltage becomes higher than the set voltage.

By the way, as the above given multiplication factor, the following examples are given in a case of 150-A MAG welding with a soft steel wire (1.2-mm diameter). That is, the factor is assumed to be 0.95 when the difference between the average output voltage and the set voltage (16.8 V) is +1 V; 1.05, when −1 V. In this case, arc initial currents 105*d* and 105*e* are 190 A and 210 A, respectively, for 200 A, which is an example of given current value I preliminarily set.

These multiplication factors and given values preliminarily set (arc initial currents 105*d* and 105*e*) are set by setting unit 9 based on at least one of the values input to setting unit 9: set current, set voltage, wire feeding speed, shielding gas type, wire type, wire diameter, welding method, and others.

In this embodiment, when the average output voltage is equal to the set voltage, a current immediately after short circuit opening is controlled for a given current value I.

The average output voltage is repeatedly calculated for every given time period T, while that compared to the set voltage is a value immediately before that calculated when arc initial control unit 12 exercises current control, namely the latest one having been calculated.

The present invention may be used for controlling after a short circuit in pulse welding.

Industrial Applicability

The present invention expands the application range when a disturbance changing the arc length occurs and when gap welding is performed to improve productivity in a welding work, and thus is industrially useful mainly as an arc welding control method and an arc welding apparatus in welding generating a short circuit.

Reference Marks in the Drawings
 1 Commercial power supply
 2 Primary rectifier
 3 Switching element
 4 Transformer
 5 Secondary rectifier
 6 Reactor
 7 Short circuit arc determining unit
 8 Drive unit
 9 Setting unit
 9*a* Average voltage calculating unit
 9*b* Voltage comparing unit
 10 Welding voltage detecting unit
 11 Welding current detecting unit
 12 Arc initial control unit
 12*a* Welding output current computing unit
 13 Arc control unit
 14 Short circuit control unit
 15 Timer unit

The invention claimed is:

1. An arc welding control method in which an object to be welded is welded by alternately repeating a short circuit period, during which a welding wire and the object to be welded short-circuit, and an arc period, during which an arc is generated and discharged, the method comprising:
  comparing average output voltage, which is an average of welding voltage calculated during welding, to set voltage preliminarily set; and
  controlling a welding output current produced when the arc is generated based on the comparison result therefrom, such that the welding output current produced when the arc is generated is calculated using a difference between the average output voltage and the set voltage,
  wherein, when the average output voltage is higher than the set voltage, a welding output current produced when the arc is generated is controlled such that the welding output current is smaller than a given current value preliminarily set, based on a difference between the average output voltage and the set voltage, and
  wherein, when the average output voltage is lower than the set voltage, the welding output current produced when the arc is generated is controlled such that the welding output current is larger than the given current value, based on the difference between the average output voltage and the set voltage.

2. The arc welding control method of claim 1,
wherein, when the average output voltage is higher than the set voltage, the given current value is multiplied by a multiplication factor smaller than 1, and
wherein, when the average output voltage is lower than the set voltage, the given current value is multiplied by a multiplication factor larger than 1.

3. The arc welding control method of claim 1,
wherein the welding output current is decreased immediately before the arc generation to open the short circuit.

4. An arc welding apparatus that alternately repeats a short circuit period, during which a welding wire and an object to be welded short-circuit, and an arc period, during which an arc is generated and discharged, to weld the object to be welded, the apparatus comprising:
- a welding current detecting unit detecting a welding output current;
- a welding voltage detecting unit detecting welding output voltage;
- a switching element controlling welding output;
- a short circuit arc determining unit determining whether a welding state is in the short circuit period or in the arc period;
- a setting unit for setting at least one of a current and voltage during the short circuit period, at least one of a current and voltage during the arc period, a set voltage, and a given current value;
- an arc initial control unit controlling the welding output current produced when the arc is initially generated;
- a drive unit controlling the switching element based on output from the short circuit arc determining unit;
- a timer unit receiving output from the short circuit arc determining unit, timing a given time period from when the arc is generated, and outputting the time to the drive unit;
- an average voltage calculating unit calculating average output voltage which is an average of the welding voltage based on a detection result from the welding voltage detecting unit; and
- a voltage comparing unit comparing set voltage set by the setting unit to average output voltage calculated by the average voltage calculating unit, wherein the arc initial control unit controls a welding output current produced when the arc is generated based on the comparison result from the voltage comparing unit, such that the welding output current produced when the arc is generated is calculated using a difference between the average output voltage and the set voltage,
wherein, when the average output voltage is higher than the set voltage, a welding output current produced when the arc is generated is controlled such that the welding output current is smaller than a given current value preliminarily set, based on a difference between the average output voltage and the set voltage, and
wherein, when the average output voltage is lower than the set voltage, the welding output current produced when the arc is generated is controlled such that the welding output current is larger than the given current value, based on the difference between the average output voltage and the set voltage.

5. The arc welding control apparatus of claim 4, further comprising:
a welding output current computing unit calculating the welding output current produced when the arc is generated,
wherein, when the average output voltage is higher than the set voltage, the given current value is multiplied by a multiplication factor smaller than 1, and
wherein, when the average output voltage is lower than the set voltage, the given current value is multiplied by a multiplication factor larger than 1.

* * * * *